United States Patent
Moore (10) Patent No.: US 12,375,749 B2
(45) Date of Patent: Jul. 29, 2025

(54) SYNCHRONIZATION OF INDEPENDENT SERVICES

(71) Applicant: Atmosphere.tv, Austin, TX (US)

(72) Inventor: Ben Moore, Austin, TX (US)

(73) Assignee: Atmosphere.tv, Austin, TX (US)

( * ) Notice: Subject to any disclaimer, the term of this patent is extended or adjusted under 35 U.S.C. 154(b) by 318 days.

(21) Appl. No.: 17/867,013

(22) Filed: Jul. 18, 2022

(65) Prior Publication Data

US 2024/0022782 A1    Jan. 18, 2024

(51) Int. Cl.
| | |
|---|---|
| H04N 21/43 | (2011.01) |
| H04N 21/643 | (2011.01) |
| H04N 21/845 | (2011.01) |
| H04N 21/8547 | (2011.01) |

(52) U.S. Cl.
CPC ....... *H04N 21/4307* (2013.01); *H04N 21/643* (2013.01); *H04N 21/8456* (2013.01); *H04N 21/8547* (2013.01)

(58) Field of Classification Search
None
See application file for complete search history.

(56) References Cited

U.S. PATENT DOCUMENTS

| | | | |
|---|---|---|---|
| 7,913,157 B1 * | 3/2011 | Stoakley | H04N 21/234318 725/135 |
| 9,021,518 B2 | 4/2015 | Theriault | |
| 10,708,658 B2 | 7/2020 | Theriault | |
| 10,979,477 B1 * | 4/2021 | Cabrido | H04L 65/611 |
| 2013/0014155 A1 * | 1/2013 | Clarke | G11B 27/105 725/32 |
| 2014/0321826 A1 * | 10/2014 | Stelmack | H04N 21/47217 386/201 |
| 2016/0173961 A1 * | 6/2016 | Coan | H04N 21/8456 725/32 |
| 2017/0111418 A1 * | 4/2017 | Warren | H04L 67/02 |
| 2019/0146951 A1 * | 5/2019 | Velmurugan | H04L 67/02 707/822 |
| 2019/0313147 A1 * | 10/2019 | Cava | H04N 21/2668 |
| 2019/0379924 A1 * | 12/2019 | Massoudi | H04L 45/72 |
| 2020/0068232 A1 * | 2/2020 | Lipczynski | H04N 21/25883 |
| 2020/0220909 A1 * | 7/2020 | Booth | H04N 21/8456 |
| 2020/0396521 A1 * | 12/2020 | Weiner | H04L 65/612 |
| 2021/0274241 A1 * | 9/2021 | Cava | H04N 21/812 |
| 2021/0297725 A1 * | 9/2021 | Chapman | H04N 21/25891 |

* cited by examiner

*Primary Examiner* — Alexander Q Huerta (57) ABSTRACT

Systems and methods are disclosed for synchronization of independent services. In certain embodiments, a method may comprise generating output synchronized to a secondary service output, including obtaining a manifest of events corresponding to the secondary service output, generating a resource schedule of resources to call at specified timestamps based on the manifest, executing a selected resource when a corresponding timestamp is received, and providing an output from the selected resource.

20 Claims, 5 Drawing Sheets

SYNCHRONIZATION OF INDEPENDENT SERVICES

SUMMARY

In certain embodiments, a method may comprise generating output synchronized to a secondary service output, including obtaining a manifest of events corresponding to the secondary service output, generating a resource schedule of resources to call at specified timestamps based on the manifest, executing a selected resource when a corresponding timestamp is received, and providing an output from the selected resource.

In certain embodiments, a system may comprise a synchronized streaming service (SSS) computing system. The SSS computing system may be configured to obtain a manifest of events corresponding to a secondary service output from a secondary content source, generate a resource schedule of resources to call at specified timestamps based on the manifest, execute a selected resource when a corresponding timestamp is received, and provide an output from the selected resource synchronized to the secondary service output.

In certain embodiments, a memory device may store instructions that, when executed, cause a processor to perform a method comprising generating output synchronized to a secondary service output, including obtaining a manifest of events corresponding to the secondary service output, generating a resource schedule of resources to call at specified timestamps based on the manifest, executing a selected resource when a corresponding timestamp is received, and providing an output from the selected resource.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
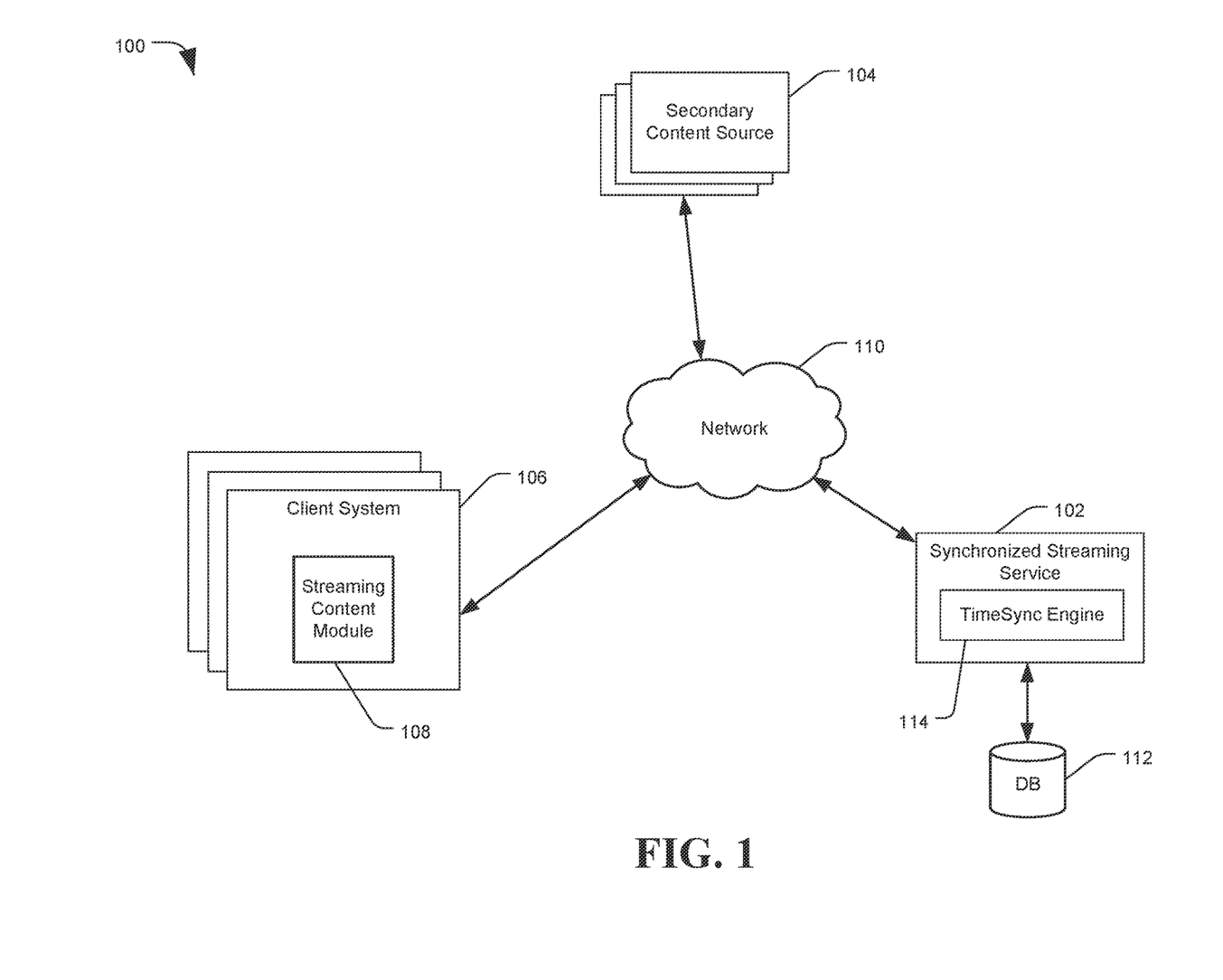
FIG. 1 is a diagram of a system configured for synchronization of independent services, in accordance with certain embodiments of the present disclosure.

FIG. 1 depicts a diagram of a system 100 configured for synchronization of independent services, in accordance with certain embodiments of the present disclosure. The system may include a synchronized streaming service (SSS) 102, one or more secondary content sources 104, one or more client systems 106, and one or more networks 110 over which the components of system 100 may communicate and exchange data. Each or any of SSS 102, secondary content sources 104, client systems 106, and network 110 may be implemented via computers, servers, hardware and software modules, or other system components. Further, SSS 102 may include or have access to a database or storage system 112. DB 112 may include one or more data storage devices, data storage mediums, data storage servers, and related data structures, and may store information about client systems 106 or associated clients, streaming content data, resource libraries or executable code, or other information.

Client systems 106, such as computers, smartphones, set-top boxes, or connected televisions (CTVs) or other display devices, may receive streaming content such as video feeds. Client system 106 may include a streaming content module 108. Streaming content module 108 may receive streamed content, such as via network 110, and perform any data conversion necessary to display the streaming content on client system 106. In some examples, a business may employ a television or video display client system 106 to show streamed content at the business location for the entertainment of customers.

Streaming content may include both video segments as well as supplemental overlay data, such as news tickers, sports scores, stock market updates, a listing of current or upcoming video segments, or other data. The video or other media content may be provided from one source (e.g., secondary content source 104), while the overlay data may be provided from another source (e.g., synchronized streaming service 102). For example, the overlay content may be in the form of an HTML (hypertext markup language) frame or border that is overlayed onto a separate video stream. Even when the overlay and the content stream are from different sources, however, they may present related information. For example, the overlay frame may show a list of titles or descriptions for the video stream segments, with a highlighted title on the overlay frame updating when the video segment changes. Two independent services that require actions to be performed in unison can present technical difficulties when the services cannot communicate with each other to indicate that a specific action has been triggered. For example, keeping the various elements of a combined stream synchronized, such as the video segments and the overlay data, without communication of trigger points, may not be addressed by current technology. Systems and methods to synchronize content from different services is desirable.

Accordingly, the SSS 102 may include or employ a TimeSync engine 114 configured to synchronize content from different services as described herein. The TimeSync engine 114 may include a module having a library that can register repeatable actions to be performed on specific timestamps provided by a shared event manifest standard. The SSS 102 may obtain a manifest, runbook, playlist, or similar file corresponding to a sequence of events from the secondary content source 104 (e.g., a manifest indicating timing for a collection of video segments in a content stream). The TimeSync engine 114 may include a resource scheduler with calls to various available resources or actions to be performed at specified timestamps, based on the manifest. A time emitter may output numbered timestamps at a selected interval (e.g., one per second), that can trigger the activation of resources through the resource scheduler on the corresponding timestamps. The activated resources or actions can produce content output from the synchronized streaming service (such as an HTML, overlay frame for streaming video from the secondary content source 104) that is synchronized with the output of the secondary content source 104, despite the SSS 102 not monitoring the output of the secondary content source or receiving trigger communications from the secondary content source 104. The resource libraries, executable code, or content output of the SSS 102 may be stored in database 112. In some examples, the SSS 102 may include a graphics web app (e.g., using HTML5) implementing the TimeSync engine 114 to generate the overlay data, combining the overlay data and the video content, or both.

The synchronized content stream from secondary content source 104 and SSS 102 may be provided to client system 106 for display, execution, or consumption, e.g., via streaming content module 108. In an example embodiment, an overlay data frame from SSS 102 may be synchronized to and combined with a video stream from secondary content source 104, without actual monitoring of the video stream content.

Although an example embodiment is discussed herein where the SSS 102 obtains the manifest from secondary content source 104, generates the synchronized content, generates the combined stream, and provides it to client system 106, other embodiments are also possible. For example, SSS 102 may only receive a manifest or metadata from secondary content source 104 and never receive the actual content stream, and may generate and provide the synchronized overlay data to secondary content source 104. The combined stream may be generated at or by the secondary content source 104 and provided to client system 106 directly, or via SSS 102 or another element or service. In another example, a third entity may combine a video stream from secondary content source 104 and overlay data from SSS 102, and provide the combined synchronized content to client system 106. Performing various operations of the synchronization of independent services process at different components of system 100 may provide different advantages or disadvantages, and therefore the distribution of operations may be adjusted based on a desired implementation. An example implementation is discussed in more detail in regard to FIG. 2.

Figure 2:
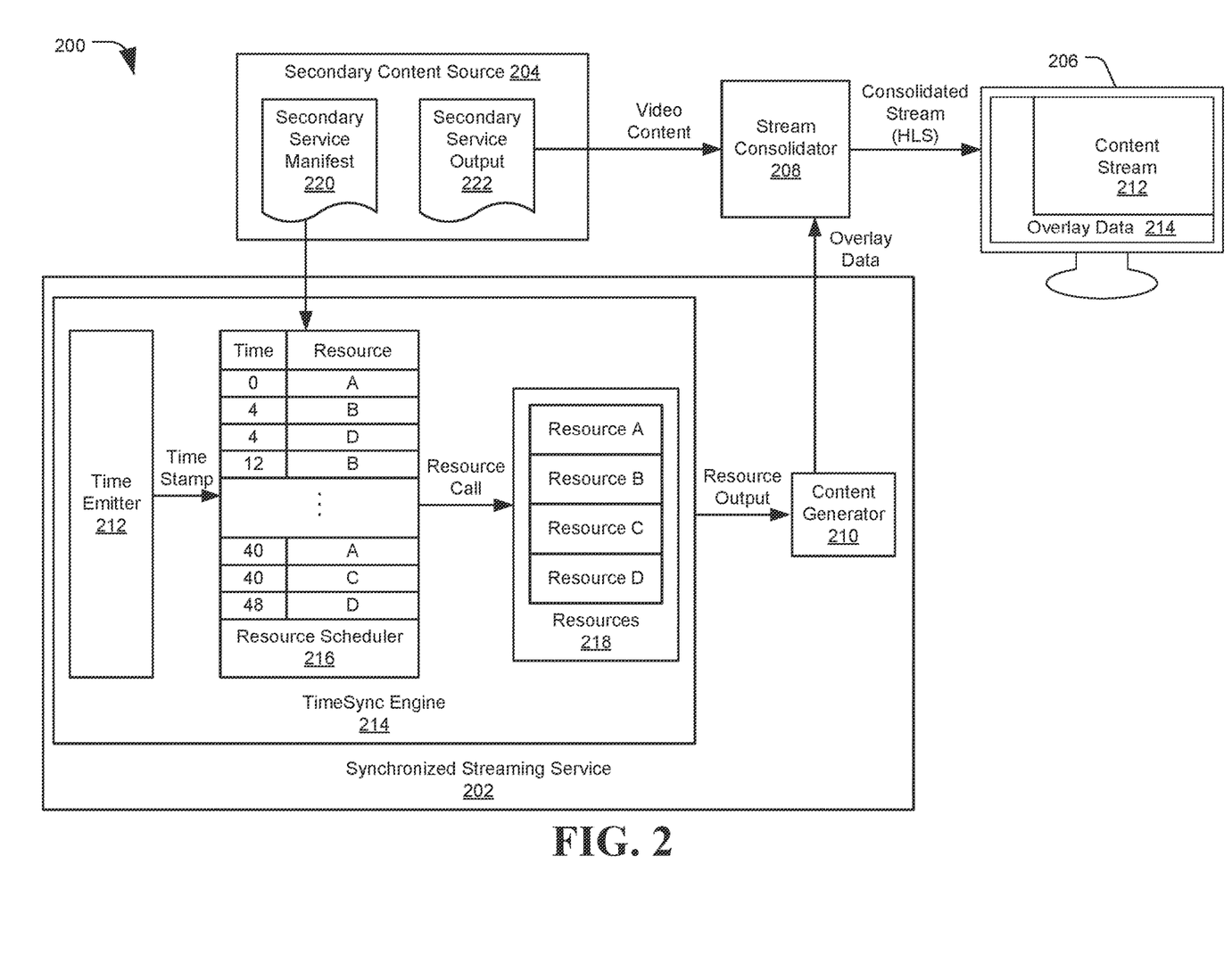
FIG. 2 is a diagram of a system configured for synchronization of independent services, in accordance with certain embodiments of the present disclosure.

FIG. 2 depicts a diagram of a system 200 configured for synchronization of independent services, in accordance with certain embodiments of the present disclosure. In particular, FIG. 2 presents an example embodiment of a synchronized streaming service (SSS) 202 configured to generate output synchronized to the output of a secondary content source 204 without either service monitoring the output of the other service. In some embodiments, the system 200 of FIG. 2 may correspond to the system 100 of FIG. 1.

System 200 may include SSS 202, secondary content source 204, client system 206, and a stream consolidator element 208. The SSS 202 may include a TimeSync engine 214 and a content generator 210. The TimeSync engine 214 may include a time emitter 212, a resource scheduler 216, and a resource library or collection 218. Secondary content source 204 may provide or generate a secondary service manifest 220, and a secondary service output 222.

The time emitter or timestamp emitter 212 may be a module configured to issue timestamps or numbered timing outputs at a selected interval (e.g., once per second, twice per second, etc.). The issued timestamps may include incrementing or decrementing numbers, so that the individual timing outputs are distinguishable from each other.

The resource scheduler 216 may include a module or data structure which can be used to call or implement specific resources based on a corresponding timestamp. For example, the resource scheduler 216 may receive a timestamp from the time emitter 212, and use the timestamp value to access a lookup table (LUT) that correlates particular timestamps to a corresponding resource (such as a computer function or operation), and activate the one or more resources corresponding to the received timestamp.

The resource library or collection 218 may include a set of one or more program modules or computing functions configured to execute a particular task. The resources in the resource library 218 may be stored or implemented locally at the SSS 202, or remotely at other servers or systems (e.g., accessed via network 110 of FIG. 1). The resource scheduler 216 may perform a resource call, which may include an identifier, input data, or other information for a selected resource. The called resource may perform the corresponding action and produce a resource output, which may include a data value, a graphical effect, HTML code, or other output.

The content generator 210 may be a module configured to receive the resource output and produce content based on or including the resource output. For example, this may include converting a data value or trigger information from the resource output into a graphical display via an HTML file. In some examples, the resources from resource library 218 may produce the content directly without an additional content generator 210 element. In an example, the content produced by content generator 210 may include a graphical overlay element designed to be combined with a video content stream.

The secondary content source 204 may be a system or element separate from the SSS 202 that produces output that can be synchronized with output from the SSS 202 (e.g., synchronized with the output of the content generator 210). The secondary content source 204 may produce a secondary service output 222, and a corresponding secondary service manifest 220. The secondary service manifest 220 may include a playlist, schedule, runbook, or metadata file providing details about the secondary service output 222. In an example embodiment, secondary service output 222 may include a sequence of video files output as an HLS (HTTP live stream) stream, and the secondary service manifest 220 may include a listing of a start time of each video segment (e.g., based on an arbitrary start of the stream rather than a real-world clock time), a type of each video segment (e.g., music video, news clips, commercial break, etc.), or other metadata about a segment of the HLS. The secondary service output 222 may comprise a linear video stream, rather than a downloadable block of video footage, and accordingly the secondary service manifest 220 may detail an expected or scheduled sequence of content rather than a pre-generated or already constructed sequence of video. In other examples, the secondary service output 222 may include a video file (e.g., MP4) that may be downloaded.

The stream consolidator 208 may be a module configured to combine the outputs from the secondary content source 204 and the SSS 202. For example, if the secondary service output 222 is an HLS stream of video segments, and the output of SSS 202 includes an HTML overlay, the stream consolidator 208 may generate a consolidated HLS having the video stream overlayed with the HTML overlay element. The consolidated stream may be provided from the stream consolidator 208 to a client system 206. The stream consolidator 208 may be part of or controlled by the SSS 202, the secondary content source 204, the client device 206, a system or module separate from any of the above, or distributed across multiple systems or modules.

Client system 206 may be a computing system configured to receive the consolidated content stream from stream consolidator 208, and display or execute it. In an example embodiment, client system 206 may include a display device and a network-connected processing system configured to receive HLS video streams and display them on the display device. An example embodiment of how a consolidated HLS stream having synchronized content from both SSS 202 and secondary content source 204 will be described herein.

The SSS 202 may first obtain a secondary service manifest 220 from secondary content source 204. In an embodiment where secondary content source 204 produces a sequence of video content as the secondary service output 222, the manifest 220 may include a metadata list or file identifying a start or end time of the included video segments, and potentially additional details about each segment (e.g., a title or artist for a segment, whether the segment includes advertising or an advertising break, etc.). The manifest 220 may be sent, directly or indirectly, by the secondary content source 204 to the SSS 202, or the SSS 202 may access the secondary content source 204 to retrieve the manifest 204, or the manifest may be obtained in other ways (e.g., based on a review or analysis of the secondary service output 222 to generate the manifest 220). In some examples, the manifest 220 may be a listing of video content segments available from the secondary content source 204, and the SSS 202 may generate a list of which segments to include in a stream and create a "playlist" of select video segments from the secondary content source's video library.

Based on the manifest 220, the SSS 202 may configure the time emitter 212 to emit sequential timestamps based on a duration of the secondary service output 222 (e.g., based on the length of an HLS video stream). For example, if the secondary service output 222 is a three minute long HLS, the time emitter 212 may be configured to output one timestamp per second for 180 seconds. The time emitter may begin issuing timestamp values at a start time identified in the manifest 220 or otherwise identified by the SSS 202.

The SSS 202 may also populate or create the resource scheduler 216 based on the manifest 220. For example, the resource scheduler 216 may include a listing of specific timestamp values, and a corresponding resource to call for each value. The resource scheduler may also include metadata to provide to a resource for the associated timestamp (e.g., an artist name for a video segment may be provided to a resource that generates an overlay to display the artist for the segment). In some embodiments, the SSS 202 may use the resource library 218 to generate an overlay graphic, such as using HTML (hypertext markup language). The overlay may be superimposed or combined with video imagery from secondary service output 222, e.g., at stream consolidator 208. The overlay may include information such as an "up next," "currently playing," or "playlist" indicator identifying the accompanying stream content 206. The overlay data may also include news tickers, sports scores, stock market tickers, weather data, advertising, or other information.

After generating or populating resource scheduler 216, it may receive the time stamp outputs from time emitter 212 and compare them against the list of resource calls. If there is no matching timestamp in the resource scheduler 216, the time stamp may be ignored. If there is one or more matching time stamp in the resource scheduler 216, the resource scheduler may execute the associated resource call. In the example of FIG. 2, at an initial time stamp 0, a resource "A" may be called, potentially using corresponding metadata used to execute or access resource A. At time stamp 4, both resources B and D may be called.

The resources of resource list or library 218 may perform operations when called by resource scheduler 216, and produce resource output. In an example, the resources 218 may be used to generate, update, or modify an HTML overlay page based on what content is currently being streamed in the secondary service output 222. For example, the first resource called at timestamp 0, resource A, may be configured to first configure and display the overlay at the start of the video stream. The overlay data 214 may be presented as an "L-bar" over a content stream 212, as depicted on client system 206. The overlay may present a listing of video segments included in the secondary service output 222, with the currently playing segment highlighted. When one video segment ends and a next begins, a resource may be called to scroll the highlighted title to the next in line. The overlay may also include news, sports, stocks, or weather tickers, advertising fields, or other information, which may be switched or updated by one of the resources 218. The content stream 212 may include breaks for full-screen advertisements, and one of the resources 218 may be configured to hide the overlay during the commercial breaks, or present an advertisement for a time period during the break. Other functionality of the resources 218 is also possible.

The output from the resources 218 may be implemented or converted into content at content generator 210. For example, the resources may output update data or instructions for an HTML overlay, and the content generator may implement the instructions via dynamic changes to the code of an overlay HTML page. In some examples, the resources 218 may implement the changes or content directly, without content generator 210.

The content produced based on the resources 218 and content generator 210 may be output to a stream consolidator 208. The stream consolidator 208 may also receive the secondary service output, and in the depicted example, overlay the overlay data over the content stream from the secondary content source 204, producing a consolidated stream having both the video and overlay data combined into a single stream.

The client system 206 may receive the consolidated stream or video file, and display it or execute it locally. For example, the consolidated stream may be displayed as a video feed having both the video content stream window 212, displaying the content from secondary content source 204, and the overlay data frame 214, displaying content from SSS 202. The two portions of the stream, including content stream 212 and overlay data 214, may change and update in a unified or synchronized fashion, even though the two portions came from different sources. An example implementation of the system of FIG. 2 is described in more detail in regard to FIG. 3.

Figure 3:
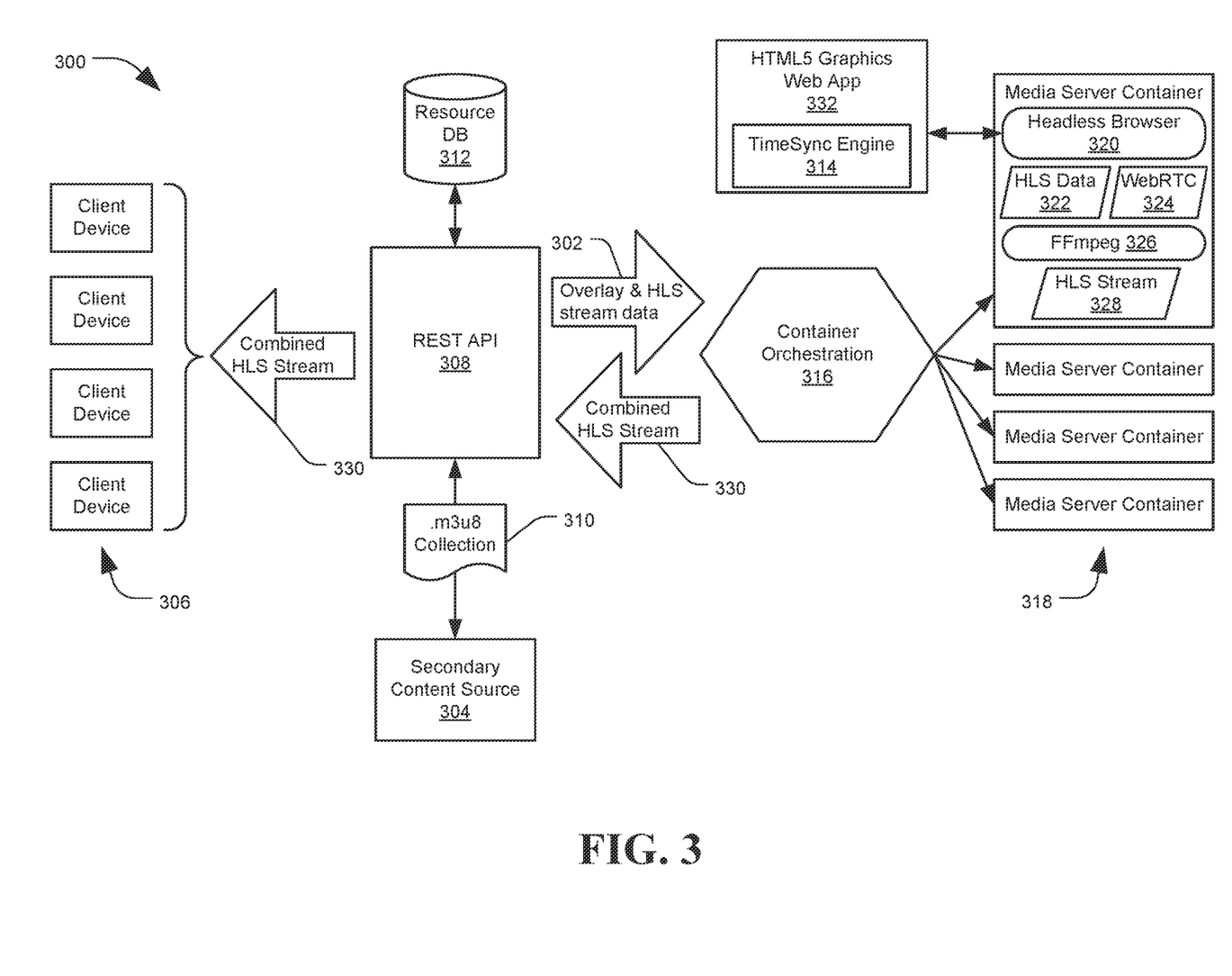
FIG. 3 is a diagram of a system configured for synchronization of independent services, in accordance with certain embodiments of the present disclosure.

FIG. 3 depicts a diagram of a system 200 configured for synchronization of independent services, in accordance with certain embodiments of the present disclosure. In particular, FIG. 3 presents an example embodiment of a process flow for a synchronized streaming service (SSS) generating output that is synchronized with the output of a separate service. In some embodiments, the system 300 of FIG. 3 may correspond to the system 100 of FIG. 1 or the system 200 of FIG. 2.

System 300 may include one or more client devices 306, which may correspond to client system 106 of FIG. 1 or client system 206 of FIG. 2. Each client device 306 may have a device identifier (ID), which may uniquely identify a particular device, and in some examples may be used for network addressing or accessing the client device 306 remotely.

In some examples, an SSS may be running or employing software to manage data and orchestrate synchronized stream or content creation and delivery. In the depicted embodiment, the SSS may employ a representational state transfer (REST) web service architecture, such as a REST or RESTful API (application programming interface) 308 for data handling. The REST API 308 may have access to a database (DB) 312 with metadata for client devices 306, resource libraries, resource scheduler data structures, manifests or playlists 310 of content from secondary content source 304, data or other content to include into overlay data for a stream, or other data. The SSS may use the DB 312 to store a manifest 310 from the second content source 304, populate a resource scheduler, access resources from the DB 312 or elsewhere, generate synchronized content, and lookup IDs or addresses for client devices 306 in order to send a combined HLS stream 330 to an appropriate device 306.

The REST API 308 may receive a manifest 310 from the secondary content source 304. Content from secondary content source 304 may be accessed via web addressing links or other access protocols. For example, the manifest 310 may be in the form of an .m3u8 file or collection, which may be a UTF-8 encoded playlist file; a plain text file that can be used by audio and video players to describe where media files are located. In an example embodiment, the REST API 308 may have access to both a manifest 310 providing addressing for an HLS video stream from the secondary content source 304, and data for inclusion in an overlay data graphical element. The manifest and overlay information may be in the form of one or more links (e.g., uniform resource locator "URL" addresses) or actual data files containing the content. The HLS stream may be raw content without any overlay data, and may be accessible over a network from the secondary content source 304. In some examples, the actual HLS stream may be provided from the secondary content source 304 to the REST API 308, from which it could be forwarded to other components.

The overlay and HLS stream data 302 may include access information or references to video, audio, or overlay content to be combined into a synchronized stream feed for a client device 306. The REST API 308 may provide the overlay and HLS stream data 302 to a container orchestration module 316, which may manage and coordinate one or more media server containers 318. A container may be a collection of software component instances, such as a package of application code and its dependencies (e.g., libraries, binaries, and any additional configuration files). A media server container 318 may be the software used to combined synchronized elements from multiple sources into a combined HLS stream 330, and provide the combined stream to a client device 306 (either directly, or via REST API 308 or another system). In some examples, multiple HLS streams may be available to client devices 306, and a separate media server container 318 may run for each separate stream. The container orchestration module 316 may be used for the automation of management for containerized workloads and services, including provisioning, deploying, scaling (up and down), networking, load balancing, or other operations. The container orchestration module 316 may receive the overlay and HLS stream data 302, and either provision a new media server container 318 to generate the combined stream 330, or direct an existing media server container 318 to implement the stream 330.

An example media server container 318 may include a headless web browser 320, HLS data 322, a WebRTC (real-time communication) 324, an FFmpeg ("fast forward" moving picture experts group) 326, and an HLS stream 328. A headless browser 320 (e.g., headless Chrome®) may be a version of a browser that operates without UI elements. In an example, the headless browser 320 may be used to generate a combined HLS stream 328 using web-based content sources, such as a web-based overlay frame and web-based streaming audio and video content. The HLS data 322 may include the HLS information from the REST API 308 identifying the content to include in the combined stream 328. The HLS data 322 may be in the form of a pre-made content stream, or a collection of links or playlist metadata for accessing the content, e.g., from secondary content source 304. The WebRTC 324 may be an example open-source system enabling RTC for web browsers via APIs. The WebRTC 324 may enable peer-to-peer or streaming communications between systems, enabling the media server container 318 to stream a content stream to a client device 306. FFmpeg 326 may include a suite of libraries and programs for processing video, audio, or other multimedia streams. FFmpeg 326, or another program or service, may perform format transcoding, editing, scaling, post-production and standards compliance, and other processing operations for a content stream.

The media server container 318 may use the headless web browser 320 to access a graphical web app 332, including the TimeSync Engine 314, to generate the overlay graphical data. For example, the overlay and HLS stream data may include the manifest 310 and information necessary to configure the TimeSync engine 314 as described in regard to FIG. 2, including configuring a time emitter, generating or populating a resource scheduler, and calling resources to produce a resource output. The media server container 318 may combine overlay data output from the graphics web app 332 with a content stream from secondary content source 304, and generate a combined and synchronized HLS stream 328. The finalized HLS stream 328 may be broadcast 330 to client device 306, either directly, via container orchestration module 316 and REST API 308, or via other systems. The stream 330 may be provided to an appropriate client device 306 based on the associated device ID and network addressing for the client device 306.

The components of system 300 may be distributed among one or more devices, as shown in FIG. 1. For example, REST API 308, container orchestration module 316, media server containers 318, and graphics web app 332 may be implemented at a synchronized streaming service 102, while secondary content source 304 may be implemented at a secondary content source system 204, and client devices 306 may be implemented at client system 106. However, various components, such as container orchestration module 316, media server containers 318, and graphics web app 332 may be implemented at a different one of the above systems, distributed across multiple of the systems, or at a separate system entirely. An example method for implementing synchronization of independent services is discussed in regard to FIG. 4.

Figure 4:
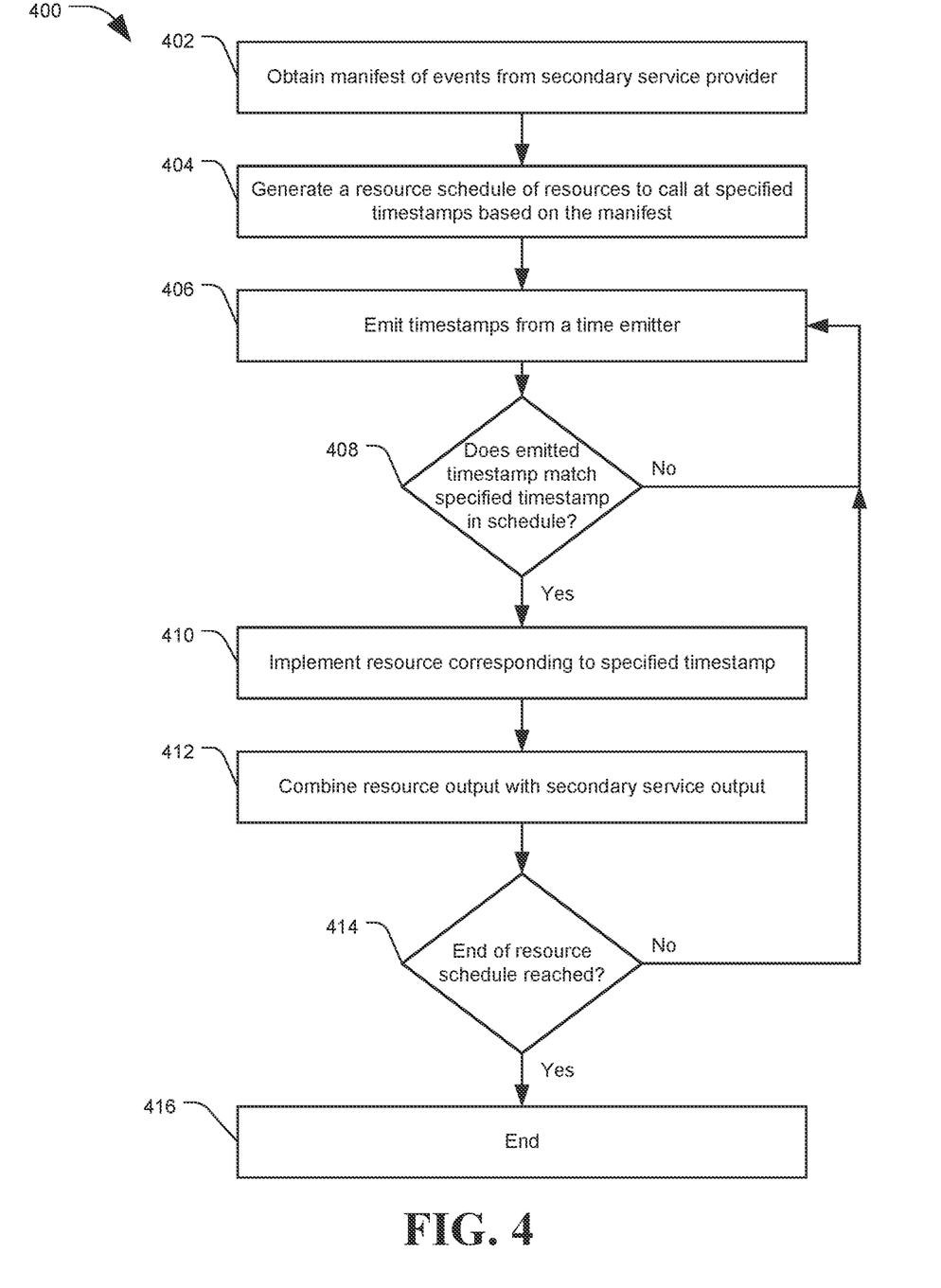
FIG. 4 is a flowchart of an example method for synchronization of independent services, in accordance with certain embodiments of the present disclosure.

FIG. 4 depicts a flowchart 400 of an example method for synchronization of independent services, in accordance with certain embodiments of the present disclosure. In particular, the method of FIG. 4 may be a process for producing content at a first source synchronized to content from a second source, which can be combined into a synchronized single content element. The method of FIG. 4 may be implemented by systems shown in FIG. 1, such as synchronized streaming service (SSS) 102 and TimeSync engine 114, secondary content source 104, client system 106 and streaming content module 108, other components, or some combination thereof.

The method may include obtaining a manifest of events from a secondary service provider, at 402. For example, a secondary service provider may have pieces of content (e.g., video segments) that have been or will be arranged into a secondary content output, and the manifest may provide metadata about the secondary content output. The manifest may provide details about the content elements, such as start times or durations, details on the type of each content segment, author or title information for one or more segments, or other details. In some examples, the manifest may include a listing of content available from secondary content source 104, from which the content elements to be combined may be selected, e.g., by SSS 102. The manifest may be retrieved from secondary content source 104 by SSS 102, sent from secondary content source 104 to SSS 102, or otherwise obtained.

At 404, the method may include generating a resource schedule of resources to call at specific timestamps based on the manifest. Resources may be operations or actions, implemented by code functions, API calls to service providers, hardware modules, or implemented by other means. In an example directed to generating an HTML-based overlay for a video stream, the resources may include means for updating or switching the data depicted on the overlay, hiding or revealing the overlay, other otherwise modifying the generated HTML for the overlay. The resource schedule may correspond to resource scheduler 216 of FIG. 2, and may include a data structure or computer function configured to activate or call a resource when specific timestamps are received. The timestamps at which to activate the resources may be based on when operations, video segments, etc. are to occur based on the manifest. For example, an overlay frame for a video feed may be configured to update, via the resource scheduler, every time a video segment changes in the video feed corresponding to the manifest.

In some examples, the manifest received from the secondary service provider may give an indication of when changes will occur in the secondary service output (e.g., when video segments will change in a video feed), but the indications may be general or estimated, and not accurate to a desired specificity (e.g., accurate to within a second). The secondary service content may be reviewed, for example manually or automatically (e.g., via a computer vision algorithm configured to look for changes or breaks between video segments), to determine a more accurate timestamp to use in the resource schedule. Accordingly, the resource schedule may be set based on the manifest and further refined from review of the secondary service output.

The method may include emitting timestamps from a time emitter, such as time emitter 212 of FIG. 2, at 406. The timestamps may be configured to be emitted at a desired frequency (e.g., once per second, ten times per second, etc.), and may be numbered or otherwise distinguishable so as to invoke a correct corresponding resource from the resource schedule. In some examples, the timestamps may not be individually identifiable or numbered, and instead a resource scheduler may count timestamps received, and activate resources once a specified count has been reached.

At 408, a determination may be made whether the emitted timestamp matches a specified timestamp in the resource schedule. For example, if the current timestamp is 28, a determination may be made whether any action or resource is scheduled to be invoked at timestamp 28. If no, the method may return to 406 to wait for the next timestamp.

If the current timestamp does correspond to a specified timestamp in the schedule, the method may include implementing a resource corresponding to the specified timestamp, at 410. In some examples, a single timestamp may correspond to or invoke multiple resources or actions.

At 412, the method may include combining the resource output with the secondary service output. This may include receiving the secondary service output and combining it with the resource output (e.g., at synchronized streaming service 102 of FIG. 1), or sending the resource output to another service (e.g., stream consolidator 208 of FIG. 2) for combining with the secondary service output. In an example embodiment, the secondary service output may be a sequence of video segments in an HLS stream, and the resource output may be an HTML-based overlay frame or page that may be layered onto or consolidated with the video stream. The combined output may be sent or broadcast to another system (e.g., client system 106 of FIG. 1) as it is being combined or generated, or the entire outputs of multiple systems may be fully combined before a finalized combined output is transmitted.

A determination may be made whether an end of the resource schedule has been reached, at 414. For example, the resource schedule may be of finite length, so that no further resource calls are made once the end of the resource schedule is reached. In another example, manifest updates or further secondary service output may be received or generated, and further resource calls may be appended to the resource schedule over time. If the end of the resource schedule has not been reached, the method may include returning to 406 to await the next timestamp. If the end of the schedule has been reached, the method may end, at 416.

Figure 5:
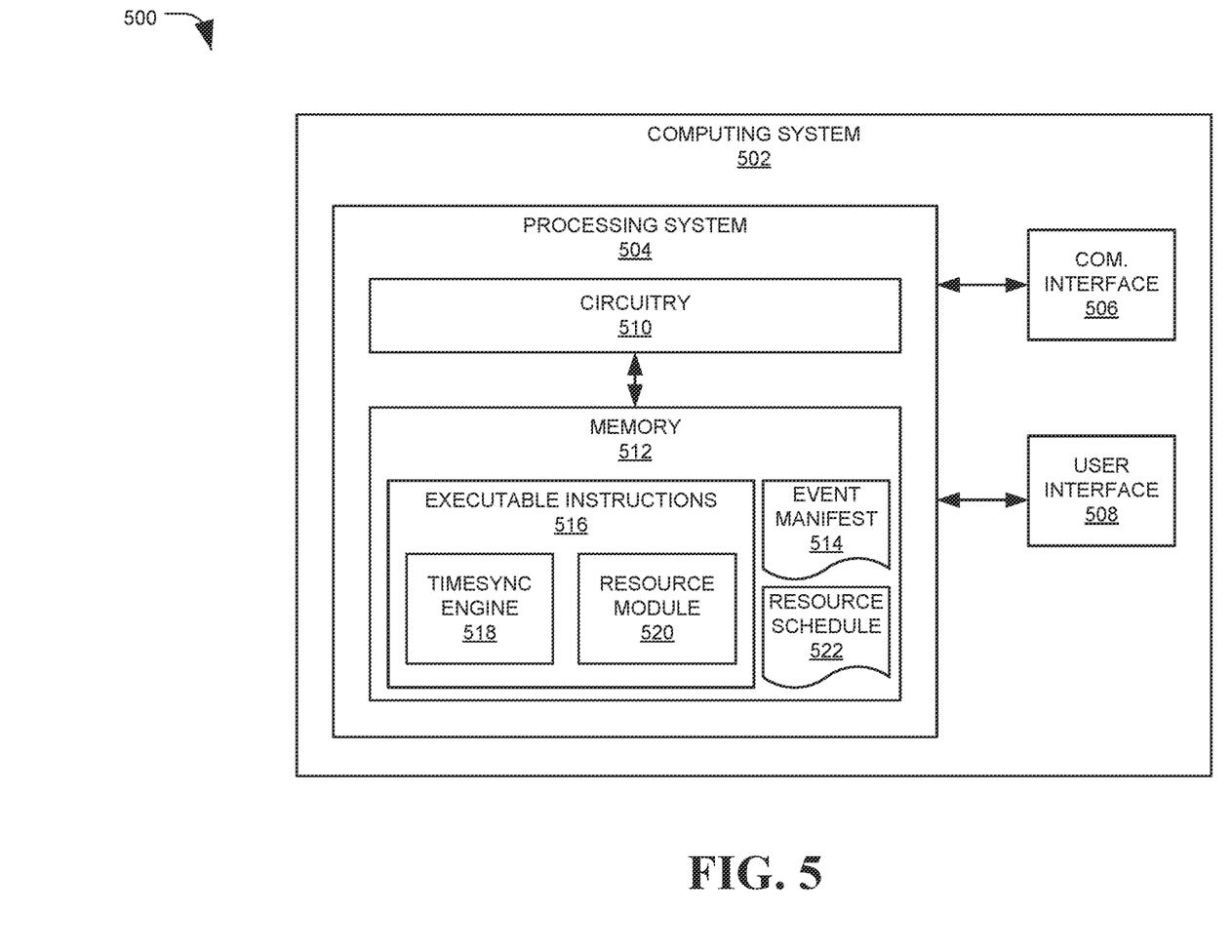
FIG. 5 is a diagram of a system configured for synchronization of independent services, in accordance with certain embodiments of the present disclosure.

Turning now to FIG. 5, a diagram of a system 500 configured for synchronization of independent services is depicted, in accordance with certain embodiments of the present disclosure. In particular, FIG. 5 depicts a computer system 502, which may be an example of any computing system that may be employed to perform the operations of elements of FIG. 1, including synchronized streaming service (SSS) 102, secondary content source 104, client system 106 or streaming content module 108, TimeSync Engine 114, and related processes and methods. Computing system 502 may include a processing system 504, a communication interface 506, and a user interface 508. Computing system 502 may include other components, such as a battery and enclosure, that are not shown for clarity. Computing system 502 may comprise one or more server computing systems, desktop computing systems, laptop computing systems, smartphone devices, set-top or streaming boxes, or any other computing system, including combinations thereof.

Communication interface 506 may comprise components that communicate over communication links, such as network cards, ports, radio frequency (RF), processing circuitry and software, or some other communication devices. Communication interface 506 may be configured to communicate over metallic, wireless, or optical links. Communication interface 506 may be configured to use Time Division Multiplex (TDM), Internet Protocol (IP), Ethernet, optical networking, wireless protocols, communication signaling, other communication formats, or any combinations thereof. In particular, communication interface 506 may be configured to communicate over a network 110 with SSS 102, client systems 106, secondary content sources 104, or other external systems. Communication interface 506 may also enable communication with local external devices, such as SSS 102 communicating with a local storage system for DB 112.

User interface 508 may comprise components that interact with a user to receive user inputs and to present media or other information. User interface 508 may include a display screen, touch screen, touch pad, keyboard, buttons, speaker, microphone, pointer device or interface, communication port, other user input/output apparatus, or any combination thereof. In some examples, user interface 508 may be a module configured to interface with a separate system for presenting information and receiving inputs. For example, computing system 502 may have limited or no direct user input components, but it connects (e.g., via communication interface 506) to a monitor or other device that may receive inputs via touch screen, remote control, or other input method, which inputs are then provided or relayed to computing system 502.

Processing system 504 may be linked to communication interface 506 and user interface 508. Processing system 504 can include processing circuitry 510 and memory device 512. Memory device 512 can store executable instructions or other operating software 516, as well as non-executable data files, such as an event manifest 514, and a resource schedule 522.

Processing circuitry 510 may comprise a microprocessor and other circuitry that can retrieve and execute instructions 516 from memory device 512. Memory 512 may comprise a non-volatile data storage medium, such as a disk drive or solid state drive, or volatile memory such as random access memories (RAM) and dynamic RAM (DRAM), or any other memory apparatus. In some examples, processing circuitry 510 may be mounted on a circuit board that may also hold memory device 512 and portions of communication interface 506 or user interface 508.

Executable instructions 516 may comprise computer programs, firmware, or some other form of machine-readable processing instructions. Executable instructions 516 may include TimeSync engine 518, and resource module 520, although related operations may be handled by multiple different modules or programs (potentially located on multiple computing devices), all operations may be performed by a single module, or additional modules may be included in executable instructions 516. For example, embodiments of TimeSync engine 518 and resource module 520 may be implemented by SSS 102, client system 106 or streaming content module 108, secondary content source 104, other systems, or a combination thereof. Executable instructions 516 may further include an operating system, utilities, drivers, network interfaces, applications, or other types of software. When executed by processing circuitry 510, executable instructions 516 may direct processing system 504 to operate computing system 502 as described herein.

TimeSync engine 518 may be a set of instructions for calling resources or performing actions synchronized to the output of an independent service. In some examples, TimeSync engine may include a time emitter 212 and resource scheduler 216 as depicted in FIG. 2. The resource schedule 522 may include a data structure populated with resource calls to make at specific timestamps, based on the event manifest 514. The event manifest 514 may be a listing or metadata of events from a secondary service provider, which may be used to determine what timestamps to correlate to resource calls. The TimeSync engine 518 may use the timestamps and resource schedule 522 to determine when to issue calls to the resource module 520.

Resource module 520 may include a set of computer functions, instructions, or access details for performing various actions and generating a resource output. For example, resource module 520 may include a library of functions that may be executed to produce different types of outputs. In another example, resource module 520 may include addressing information for accessing external resources (e.g., via communication interface 506) to perform the operations. In some examples, the resource module 520 may generate a resource output that is sent to another service for combining with an output from a secondary content source. In other examples, resource module 520 may also include functionality to combine its output with output received (e.g., via communication interface 506) from a secondary content source, and then provide the combined output to other systems (e.g., client systems 106 of FIG. 1).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
    generating output synchronized to a secondary service output, to enable independent content services to operate in unison without the communication of trigger points, including:

obtaining a manifest of events corresponding to the secondary service output;
generating a resource schedule of resources to call at specified timestamps by determining when to activate the resources to match up to points in the manifest, the resources including program modules configured to execute corresponding tasks;
executing a selected resource when a corresponding timestamp is received; and
providing an output from the selected resource, the output from the selected resource including content related to, and to be displayed in unison with, the secondary service output.

2. The method of claim 1 further comprising:
combining the output from the selected resource with the secondary service output to produce a combined output; and
providing the combined output to a client device.

3. The method of claim 2 further comprising:
emitting timestamps from a timestamp emitter at a selected interval; and
calling the resources based on the timestamps and the resource schedule.

4. The method of claim 3 further comprising:
the secondary service output includes a video stream;
the output from the selected resource includes overlay data corresponding to the video stream; and
combining the output from the selected resource with the secondary service output includes producing a combined video stream having both the video stream and the overlay data.

5. The method of claim 4 further comprising:
the video stream includes a plurality of video segments; and
the manifest of events identifies when video segments change within the video stream.

6. The method of claim 5 further comprising:
the overlay data includes visual information corresponding to the plurality of video segments; and
selecting the specified timestamps for the resource schedule to synchronize changes to the overlay data with changes in the plurality of video segments.

7. The method of claim 6 further comprising:
the secondary service output includes an HTTP live stream (HLS) video;
the overlay data includes a hypertext markup language (HTML) border for the HLS video; and
combining the HLS video and the HTML border using a media server container including a headless web browser.

8. A system comprising:
a synchronized streaming service (SSS) computing system configured to operate in unison with a secondary content source independent from the SSS computing system without the communication of trigger points, including:
  obtain a manifest of events corresponding to a secondary service output from the secondary content source;
  generate a resource schedule of resources to call at specified timestamps by determining when to activate the resources to match up to points in the manifest, the resources including program modules configured to execute corresponding tasks;
  execute a selected resource when a corresponding timestamp is received; and
  provide an output from the selected resource synchronized to the secondary service output, the output from the selected resource including content related to, and to be displayed in unison with, the secondary service output.

9. The system of claim 8 comprising the SSS computing system further configured to:
combine the output from the selected resource with the secondary service output to produce a combined output; and
provide the combined output to a client device.

10. The system of claim 8, the SSS computing system further comprising:
a timestamp emitter configured to emit timestamps at a selected interval; and
the SSS further configured to call the resources based on the timestamps and the resource schedule.

11. The system of claim 8 further comprising:
the secondary service output includes a video stream;
the output from the selected resource includes overlay data corresponding to the video stream; and
the SSS computing system further configured to combine the output from the selected resource with the secondary service output to produce a combined video stream having both the video stream and the overlay data.

12. The system of claim 11 further comprising:
the video stream includes a plurality of video segments; and
the manifest of events identifies when video segments change within the video stream.

13. The system of claim 12 further comprising:
the overlay data includes visual information corresponding to the plurality of video segments; and
the SSS computing system further configured to select the specified timestamps for the resource schedule to synchronize changes to the overlay data with changes in the plurality of video segments.

14. The system of claim 11 further comprising:
the secondary service output includes an HTTP live stream (HLS) video;
the overlay data includes a hypertext markup language (HTML) border for the HLS video; and
the SSS computing system further configured to combine the HLS video and the HTML border using a media server container including a headless web browser.

15. A memory device storing instructions that, when executed, cause a processor to perform a method comprising:
generating output synchronized to a secondary service output, to enable independent content services to operate in unison without the communication of trigger points, including:
  obtaining a manifest of events corresponding to the secondary service output;
  generating a resource schedule of resources to call at specified timestamps by determining when to activate the resources to match up to points in the manifest, the resources including program modules configured to execute corresponding tasks;
  executing a selected resource when a corresponding timestamp is received; and
  providing an output from the selected resource, the output from the selected resource including content related to, and to be displayed in unison with, the secondary service output.

16. The memory device of claim 15 storing instructions that, when executed, cause the processor to perform the method further comprising:
   combining the output from the selected resource with the secondary service output to produce a combined output; and
   providing the combined output to a client device.

17. The memory device of claim 15 storing instructions that, when executed, cause the processor to perform the method further comprising:
   emitting timestamps from a timestamp emitter at a selected interval; and
   calling the resources based on the timestamps and the resource schedule.

18. The memory device of claim 15 storing instructions that, when executed, cause the processor to perform the method further comprising:
   the secondary service output includes a video stream;
   the output from the selected resource includes overlay data corresponding to the video stream; and
   combining the output from the selected resource with the secondary service output includes producing a combined video stream having both the video stream and the overlay data.

19. The memory device of claim 18 storing instructions that, when executed, cause the processor to perform the method further comprising:
   the video stream includes a plurality of video segments;
   the manifest of events identifies when video segments change within the video stream;
   the overlay data includes visual information corresponding to the plurality of video segments; and
   selecting the specified timestamps for the resource schedule to synchronize changes to the overlay data with changes in the plurality of video segments.

20. The memory device of claim 15 storing instructions that, when executed, cause the processor to perform the method further comprising:
   the secondary service output includes an HTTP live stream (HLS) video;
   the output from the selected resource includes a hypertext markup language (HTML) overlay border for the HLS video; and
   combining the HLS video and the HTML overlay border using a media server container including a headless web browser.

* * * * *